United States Patent [19]

Rott et al.

[11] Patent Number: 5,145,378
[45] Date of Patent: Sep. 8, 1992

[54] PENDULUM PRINCIPLE DEMONSTRATION APPARATUS

[75] Inventors: Dainuri P. Rott, Palo Alto; James C. Smith, Hayward, both of Calif.

[73] Assignee: Hands on Instruments, Palo Alto, Calif.

[21] Appl. No.: 620,369

[22] Filed: Nov. 29, 1990

[51] Int. Cl.⁵ .............................................. G09B 23/08
[52] U.S. Cl. ..................................... 434/302; 434/300
[58] Field of Search .................... 434/300, 302; 33/391

[56] References Cited

U.S. PATENT DOCUMENTS

| | | | |
|---|---|---|---|
| 1,481,075 | 1/1924 | Strouse | 434/300 |
| 1,869,951 | 8/1932 | Worthington | 434/302 X |
| 3,184,884 | 5/1965 | Petrucelli . | |
| 3,339,292 | 9/1967 | Ruchlis | 434/302 |
| 3,478,466 | 12/1968 | Conner . | |
| 3,533,185 | 1/1969 | Kanbar . | |
| 4,011,674 | 3/1977 | Jacobson . | |
| 4,538,802 | 9/1985 | Van John | 434/302 |
| 4,878,296 | 11/1989 | Londino | 33/391 X |

FOREIGN PATENT DOCUMENTS 162851 4/1949 Fed. Rep. of Germany ...... 434/302
1348888 10/1987 U.S.S.R. ............................ 434/302

OTHER PUBLICATIONS

Stansi Scientific Division Catalog, 1969, p. 121.
Ealing 1969 Science Teaching Catalog, p. 63.
Romer, "A Double Pendulum 'Art Machine'", American Journal of Physics, vol. 38, No. 9, Sep. 1970, pp. 1116–1121.

Primary Examiner—Richard J. Apley
Assistant Examiner—Karen Ann Richard
Attorney, Agent, or Firm—Macro-Search, Inc.

[57] ABSTRACT

A base supports a vertical pivot arm, one end of which supports a pivotal rotation means for a rotation support housing with a plurality of radial connector sockets. One of several pendulum arms can be fitted into each of the radial connector sockets, the pendulum arms supporting a pendulous mass on each pendulum arm. One such pendulum arm is articulated into two portions, each portion with a plurality of additional pendulum arms attached thereto. The apparatus consequently demonstrates the physical principles of not just a simple pendulum, but those of a variety of compound pendulum configurations.

3 Claims, 1 Drawing Sheet

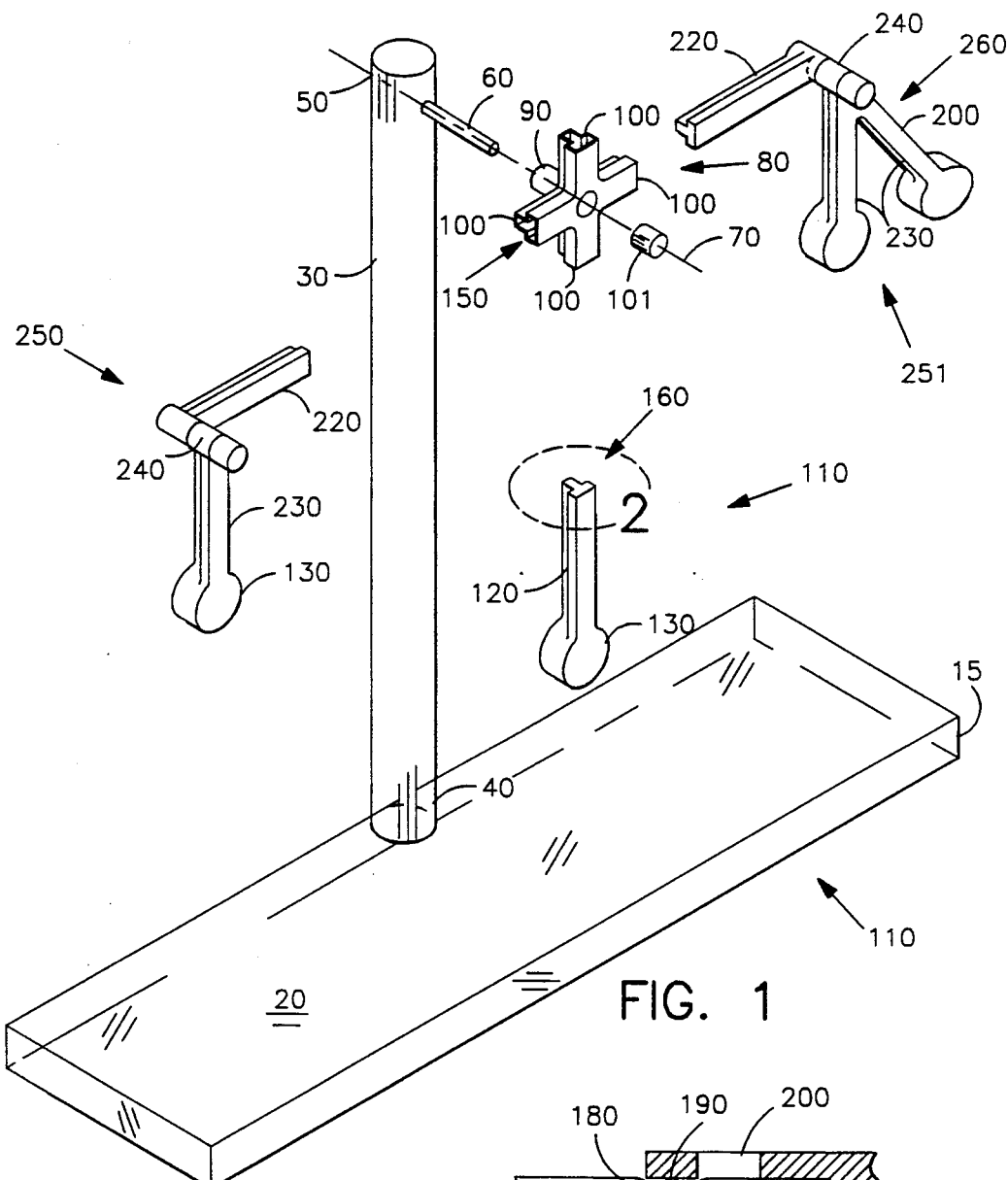
FIG. 1
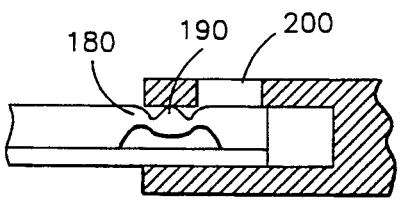
FIG. 2
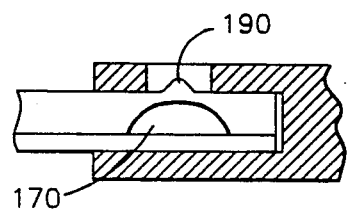
FIG. 3A
FIG. 3B

PENDULUM PRINCIPLE DEMONSTRATION APPARATUS

FIELD OF THE INVENTION

This invention relates to apparati that demonstrate physical principles. More specifically, this invention relates to apparati that demonstrate the physical principles of the pendulum.

BACKGROUND OF THE INVENTION

Understanding the natural laws and principles of nature are of great importance to man. The pendulum is a mechanism used since ancient times, being highly developed by the early mathematicians. Perhaps its most common uses have been in the relatively accurate keeping of time and in providing cadence for music. The simple pendulum consists of a string or rigid bar pivoted at one end and having a weight at the other. The weight is given an initial displacement from its rest position at bottom center and then allowed to swing. If friction and other losses are ignored, the pendulum will swing to and fro indefinitely with a periodic motion. A compound pendulum may consist of two or more simple pendulums acting and interacting in a more complex motion. A compound pendulum is capable of demonstrating simulated chaotic activity. For further information concerning the pendulum please see; Rott, N., *A Multiple Pendulum for the Demonstration of Non-linear Coupling*, J. Appl. Math. Phys. (ZAMP) 21, 570–582, 1970.

Relatively few demonstration devices exist for the investigation of pendulous motion. Yet pendulous motion is used widely in devices such as speed control instrumentation, inertial navigation instruments such as accelerometers, and a truly vast array of other applications. A variety of toys and "Executive Toys" are produced and found in the marketplace that are based upon the pendulum and its underlying principles. One such device uses magnets to alternately attract and repel a swinging pendulum. Another device creates stationary and moving graphic representations and images by coupling a drive mechanism using a pendulum. In still another device alternating motion is achieved through the transfer of energy between magnetically coupled pendulous elements.

Pendulous motion continues to be one of the most important basic mechanisms used in industry as well as one of the most interesting judging by the large number of curosity toys that use it. However, there has not been, until now, a demonstration apparatus that is at once, simple to use, relatively inexpensive to manufacture, and that demonstrates the physical principles of the pendulum in a way that is entertaining and educational to young and old, and the scientifically naive and sophisticated. The present invention fulfills these needs and provides further related advantages.

SUMMARY OF THE INVENTION

The present invention is an educational and entertainment apparatus that demonstrates the properties of a simple pendulum, as well as a range of compound pendulums. A base supports a vertically oriented pivot arm, onto which is fastened a rotational support housing with a plurality of radial connector sockets and a rotational mounting means. One of a set of pendulous arms can be snapped into each radial connector socket, the pendulous arms being of varying length, mass, and complexity. The resulting pendulum is free to rotate around the rotational mounting means.

One pendulous arm, for example, is an articulated arm, thereby forming a double pendulum. Another pendulous arm is an articulated arm with two separate pendulums extending therefrom, thereby forming a more complex double pendulum.

This apparatus effectively demonstrates the physical properties of pendulums of various complexities by allowing varying pendulous masses to be interchangeably mounted therein. Moreover, it provides entertainment in that a variety of configurations of pendulous arms and masses may be selected, each configuration demonstrating different effects. In one configuration of pendulous masses, for example, a stick figure of a human being with five "appendages" is simulated. The resulting effect of this configuration is that the stick figure, when the device is demonstrated, appears to be dancing chaotically.

The parts of the invention can be linked to create many new and unusual pendulum systems. Some of these assemblies are symmetrical while others are asymmetrical. Regular or chaotic motion results directly from the selection of specific pendulum types and assembly locations. The different pendulum configurations are characterized by the number of elements that can move independently, or the "degrees of freedom" of the configuration. The simplest case, one degree of freedom, is the classic simple pendulum having one pivoted arm holding one mass. It performs periodic motion, also called simple harmonic oscillation, the prototype of regular motion and the opposite of chaotic motion. The shorter the pendulum the faster the motion. The time period of the oscillation is related to the square root of the length of the arm. A double pendulum is created when the arm itself is pivoted so that two independent motions can occur simultaneously. This produces two degrees of freedom. Each of the two pendulums has a principle mode of oscillation. The motion of a double pendulum does not display the regularity of either principal mode but can be described by their mathematical combination. For example, any low energy motion of the double pendulum is the superposition of two oscillations with two different frequencies and can be recognized. With higher degrees of freedom more complex motions occur producing a wide range of effects and demonstrating several basic, and a range of ancillary, principles of pendulous activity.

The underlying capability of the invention to demonstrate a wide range of simple and complex motions, including stable and metastable pendulum positions, lies in the unique interlocking design feature which positions each pendulum with precision, thereby allowing excellent balance and true symmetry of operation while permitting quick parts assembly and replacement, leading to a comprehensive understanding of the physical principles of pendulous motion and energy exchange.

Other features and advantages of the present invention will become apparent from the following more detailed description, taken in conjunction with the accompanying drawings, which illustrate, by way of example, the principles of the invention.

DESCRIPTION OF THE DRAWINGS

The accompanying drawings illustrate the invention. In such drawings:

FIG. 1 is an exploded perspective view of the invention illustrating several pendulous arms;

FIG. 2 is a fragmentary perspective view as taken from FIG. 1 illustrating a connector plug as seen from the rear;

FIG. 3A is a cross-sectional view, illustrating a connector plug partially inserted into a radial connector socket; and FIG. 3B is a cross-sectional view, illustrating a connector plug fully inserted into a radial connector.

DETAILED DESCRIPTION OF THE PREFERRED EMBODIMENT

FIG. 1 illustrates an apparatus 10 for demonstrating the principles of the pendulum. The apparatus 10 comprises a base 15 for supporting a dynamic load, the base 15 having a top surface 20. The base 15 may be manufactured with any material strong enough to support a dynamic load, preferably plastic or wood, and may be of any suitable shape, preferably rectangular. An elongated pivot arm 30 is vertically disposed to the base 15 and has a proximal end 40 and a distal end 50. The proximal end 40 rigidly mounts to the top surface 20 of the base 15, and the distal end 50 supports a pivotal rotation means 60 about a horizontal axis 70.

It will be clear to anyone skilled in the art that the base 15 with elongated pivot arm 30 is only one means by which to support the pivotal rotation means 60 about a horizontal axis 70. For example, another embodiments of the invention employs a magnetic base, with the pivotal rotation means 60 therein, for magnetic attachment to a suitable vertical surface, such as a refrigerator door. In another embodiment of the invention, the elongated pivot arm 30 is replaced by a triangular shaped pivot support. Clearly, the means by which to support the pivotal rotation means 60 is secondary to the operation of the invention.

A rotation support housing 80 has a plurality of radial connector sockets 100 surrounding a rotational mounting means 90 for free rotation of the rotation support housing 80 about the horizontal axis 70 in cooperation with the pivotal rotation means 60. The rotation support housing 80 has, in the preferred mode of the invention, four radial connector sockets 100 in quadrature. The pivotal rotation means 60, in the preferred mode, is a simple round pin inserted through the rotational mounting means 90. Preferably, the rotation support housing 80 is injection molded of a suitable plastic, and incorporates the rotational mounting means 90 and the radial connector sockets 100 as a monolithic structure. The rotational support housing 80 is held onto the pivotal rotation means 60 by a cap 101.

A pendulum 110 has a pendulum arm 120 with a pendulous mass 130 attached at one end, and a connector plug 140 at the other end. The pendulous mass 130 and the pendulum arm 120, preferably, are injection molded together as one component. However, in an alternate embodiment, the pendulous mass 130 is separately attached to the pendulum arm 120, and is comprised of a suitable, relatively heavy material. The connector plug 140 is inserted into, and consequently is attached to, one radial connector socket 100, whereby the pendulum 110 is free to swing in a vertical plane from the rotation support housing 80. Consequently, the principles of the simple pendulum can be demonstrated by this simple apparatus assembly.

In the preferred embodiment of the invention, the opening 150 defined by the cross section of the radial connector socket 100 is T-shaped and the cross sectional shape 160 of the connector plug 140 is correspondingly T-shaped, defining a unique insertion orientation of the connector plug 140 into the radial connector socket 100. As a result, the pendulous mass 130 is held in a preferred orientation.

Each connector plug 140 has a clearance slot 170 therethrough, forming a thin flexible wall 180, onto which an external protrusion 190 is formed (FIGS. 2, 3A, and 3B). The radial connector socket 100 has a low clearance such that when the connector plug 140 is inserted into the radial connector socket 100, the flexible wall 180 flexes to allow the protrusion 190 to fit into the radial connector socket 100. A preferred location of the protrusion 190 is found within the protrusion clearance 200 when the connector plug 140 is fully inserted within the radial connector slot 100. As a result, the protrusion 190 holds the pendulum 110 within the radial connector socket 100 during the operation of the apparatus while still allowing the pendulum 110 to be easily snapped into or out of the radial connector socket 100 for easy assembly, disassembly, and reconfiguration of the apparatus.

An articulated pendulum arm 250 comprises a first portion 220 and a second portion 230 jointed by a pivot 240, whereby the apparatus 10 can demonstrate the principles of the double pendulum. Similarly, a complex articulated pendulum arm 251 comprises the first portion 220 and the second portion 260, the second split portion 260 having two separate extended arms 230, whereby the apparatus 10 can demonstrate the further principle of the double pendulum.

By assembling various pendulum arms 120, articulated pendulum arms 250, and complex articulated pendulum arms 251 into one or more of the radial connector sockets 100, various principles of the pendulum can be demonstrated, including the effect of pendulum arm length, pendulous mass, and effects of single, double, triple, and quadruple swinging masses. Various pendulous motion effects can be demonstrated from simple harmonic motion to oscillating energy transfer as well as multiply periodic, almost periodic, and seemingly chaotic or random motions.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An apparatus for demonstrating the physical principle of the pendulum, comprising:
   a base for supporting a dynamical load, the base having a top surface;
   an elongated pivot arm vertically disposed and having a proximal and a distal ends, the proximal end rigidly mounted to said top surface, the distal end supporting a means for pivotal rotation about a horizontal axis;
   a rotation support housing having rotational mounting means for free rotation of said rotation support housing about the horizontal axis, in cooperation with said means for pivotal rotation, said rotation support housing having at least one radial connector socket therein; and
   a set of pendulum arms having various pendulous masses, lengths, and sizes, and having one or more portions with all sections jointed by pivots to a first portion to form an articulated arm; and said pendulum arms being inserted for interchangeable configuration assembly into said rotational support housing by attaching a first of each pendulum arm said first end having a connector plug for insertion into one said radial connector socket, whereby each configuration demonstrates a pendulous activity relating to the set of pendulums in use including the single, double, triple and quadruple compound pendulum.

2. The apparatus in claim 1 wherein the opening defined by the cross section of said radial connector socket is T-shaped and the surface of said connector plug is T-shaped for mating with said opening defined by the cross section of said radial connector socket, defining a unique insertion orientation of said connector plug into said radial connector socket whereby said pendulous mass is held in a preferred orientation.

3. The apparatus of claim 2 wherein:

said connector plug has a clearance slot therethrough, forming a thin flexible wall, said flexible wall having an external protrusion thereon;

said radial connector socket has a means for protrusion clearance therein at a point located adjacent to said external protrusion when said connector plug is inserted into said radial connector socket, said flexible wall flexing to allow said protrusion to fit into said radial connector socket during insertion and finding a preferred location within said protrusion clearance when said connector plug is fully inserted within said radial connector socket; whereby said protrusion holds said pendulum within said radial connector socket during said demonstration of the physical principles of the pendulum while allowing said pendulum to be easily snapped into or out of said connector socket.

* * * * *